(12) United States Patent
Vakklaganti

(10) Patent No.: US 10,304,050 B2
(45) Date of Patent: May 28, 2019

(54) NFC CARD VERIFICATION

(71) Applicant: PayPal, Inc., San Jose, CA (US)

(72) Inventor: Suhil Srinivas Vakklaganti, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 934 days.

(21) Appl. No.: 13/766,212

(22) Filed: Feb. 13, 2013

(65) Prior Publication Data

US 2014/0229377 A1 Aug. 14, 2014

(51) Int. Cl.
*G06Q 20/32* (2012.01)
*G06Q 20/34* (2012.01)
*G06Q 20/40* (2012.01)

(52) U.S. Cl.
CPC ....... *G06Q 20/3278* (2013.01); *G06Q 20/352* (2013.01); *G06Q 20/407* (2013.01); *G06Q 20/4016* (2013.01)

(58) Field of Classification Search
CPC .................................................. G06Q 20/341
USPC ........................................................... 705/44
See application file for complete search history.

(56) References Cited

U.S. PATENT DOCUMENTS

| | | | | |
|---|---|---|---|---|
| 7,128,774 B2 * | 10/2006 | Norgren | .................. | C22C 29/08 407/119 |
| 8,571,937 B2 * | 10/2013 | Rose | ..................... | G06Q 20/12 705/16 |
| 2005/0216354 A1 * | 9/2005 | Bam | ...................... | G06Q 20/12 705/26.1 |
| 2007/0073619 A1 * | 3/2007 | Smith | ............................ | 705/41 |
| 2014/0317715 A1 * | 10/2014 | Conner | ............. | G06K 19/0718 726/7 |

FOREIGN PATENT DOCUMENTS

WO WO 1997CH237 * 12/1998
WO WO 2005/086102 * 9/2005

OTHER PUBLICATIONS

International Fraud Growth Ramps Up Crime Prevention Goodbye Magnetic Stripe, Hello Security Robert McGarvey Source: Credit Union Times Date: Apr. 18, 2012.*

* cited by examiner

*Primary Examiner* — Richard C Weisberger
(74) *Attorney, Agent, or Firm* — Haynes and Boone, LLP

(57) ABSTRACT

Methods and systems are provided for verifying the possession of a card, such as a credit card or a debit card, by a card user. Possession of the card can be verified, for example, when a purchase transaction, such as a telephone purchase transaction or an online purchase transaction, is attempted with the card and the purchase transaction is denied due to suspected account take over. Possession of the card can be verified by detecting the present of the card with a mobile device of the user, such as a smart phone. For example, possession of the card can be verified by near field communication (NFC) between the card and the mobile device, wherein the communication is sufficient to adequately determine the presence of the card.

20 Claims, 4 Drawing Sheets

NFC CARD VERIFICATION

BACKGROUND

Technical Field

The present disclosure generally relates to electronic commerce and digital wallets. The present disclosure relates more particularly to methods and systems for verifying a card, such as a credit card, debit card, private label card, or gift/pre-paid card using near field communication (NFC).

Related Art

It is not unusual for a card user to experience difficulty using a card, such as a credit card or debit card, for a telephone or an online transaction. The difficulty can be due to suspected account take over (ATO). Account take over occurs when a fraudster obtains information regarding the card, such as the card number, expiration date, and the card security code (CSC). The card security code may also be referred to as a card verification value (CVV or CV2), a card verification code (CVC), or a card code verification (CCV). With this information, the fraudster can attempt to make fraudulent telephone and online purchases.

Account take over is one usecase where the verification of a card is prompted to the customer. Another usecase requiring verification is when card information is added into a digital wallet. The verification of a card via NFC is necessary to prove the existence of the card in the hand of the user and to prove that the card information is not stolen or procured by illegitimate means. Another usecase is where a user's digital wallet account has been locked out.

A suspected account take over can occur when a card processor receives a false positive from a risk model. Various risk models are commonly used by card processors in an attempt to thwart fraudulent credit card use. A suspected account take over can occur when a card processor detects suspicious activity associated with the card. For example, use of the card outside of the geographic area within which the card is typically used, such as out of state, can be considered suspicious activity. As a further example, use of the card to purchase a product that the card user doesn't typically purchase can also be considered suspicious activity.

Regardless of the reason for suspecting an account take over, such suspicion typically results in authorization for further use of the card being withheld. No further purchases can be made with the card until it can be determined that an account take over has not occurred.

DETAILED DESCRIPTION

Figure 1:
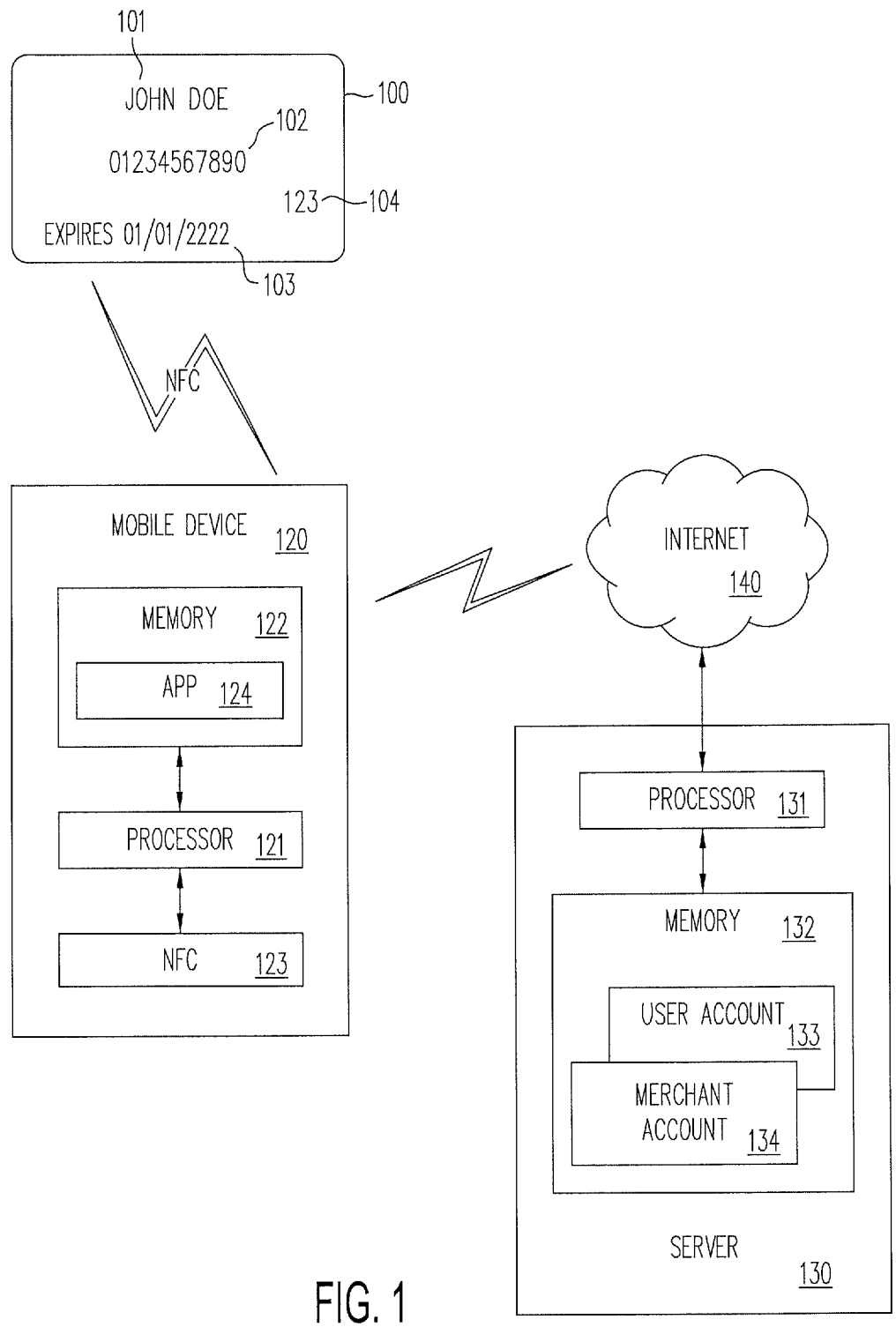
FIG. 1 is a block diagram of a system for near field communication (NFC) card verification, according to an embodiment.

A suspected account take over can prevent a card user from making a desired purchase. As discussed above, certain account activities can result in suspicion of an account take over. Thus, in some instances, a particular purchase transaction can be denied, such as due to suspicion of an account take over. The purchase transaction can be denied for other reasons, such as a higher velocity of transactions or the user of new devices or Internet Protocol (IP) addresses where the card is being accessed.

Further account activity, e.g., further purchases, can be suspended until it is determined that an account take over has not occurred. Possession of the card by a person attempting to make a purchase can indicate that the purchase transaction is legitimate. That is, such possession can indicate that the purchase transaction is not being performed as part of an account take over.

A particular purchase transaction may be assumed to be legitimate when the purchase transaction is made in person, e.g., at a brick and mortar store. In such instances, possession of the card by the person making the purchase is readily verified. However, for phone purchases, online purchases, and the like, possession of the card by the person making the purchase is less easy to verify. A fraudster can have all of the information about the card, e.g., the card user's name, card number, billing address, and card security code (CSC, CVV, CV2, CVC, or CCV). As those skilled in the art will appreciate, such information can be improperly obtained in various ways. Thus, it is beneficial to provide a method and system for verifying the possession of a card by a card user.

According to one or more embodiments, methods and systems are provided for verifying the possession of a card, such as a credit card or a debit card, private label card, gift/pre-paid card, by a card user. Such possession can be verified, for example, when a particular purchase transaction, such as a telephone purchase transaction or an online purchase transaction, is denied due to suspected account take over. Such possession can similarly be verified for any other reason.

Possession of the card can be verified by detecting the presence of the card with a mobile device of the user, such as a smart phone. For example, possession of the card can be verified by information communicated via near field communication (NFC) between the card and the mobile device. Information provided via the communication can be sufficient to adequately determine the presence of the card.

According to an embodiment, a system can comprise one or more memories that store account information regarding an account of a card user. The memories can store information regarding any desired number of accounts of card users. One or more hardware processors can be in communication with the one or more memories. The one or more hardware processors can be operable to access the one or more memories to determine that the account is subject to account take over restrictions. The one or more hardware processors can send a first communication to a mobile device of the card user requesting verification of a card via the mobile device and can receive a second communication from the mobile device indicating that a presence of the card has been detected by the mobile device and providing card information.

The one or more hardware processors can determine, at least in part from the card information and from the account information (such as the card user's card account and/or digital wallet), if the card is an authorized card of the account. If the card is an authorized card of the account, e.g., is a card of the card user such that the purchase transaction is legitimate, then the one or more hardware processors can access the one or more memories to remove the account take over restrictions of the card. Thus, the purchase transaction can be completed. If the card is not verified, e.g., is not an authorized card of the account, then the purchase transaction can be assumed to be fraudulent and can continue to be denied.

According to an embodiment, the one or more hardware processors can be operable to run a risk model for the account. The risk model can be any desired conventional risk model. The risk model can be run by the same server or entity that verifies the possession of a card. The risk model can be run by any other server or entity. A positive result for account take over from the risk model can result in suspension of the card account and/or denial of a purchase transaction.

The second communication can be indicative of card information that is communicated from the card to the mobile device. Such communication can be performed using near field communication (NFC), for example. The NFC can be initiated by tapping the mobile device with the card or vice versa.

The first communication can initiate an app of the mobile device. Alternatively, the card user can initiate the app. The app can instruct the card user to move the card proximate the mobile device to facilitate identification of the card by the mobile device. The app can instruct the card user to tap the mobile device to facilitate identification of the card by the mobile device. Such instructions can be via messages displayed on a screen of the mobile device. Such messages can be audio messages, such as voice instructions provided by the mobile device. The messages can be provided by the mobile device, e.g., can be part of the app, or can be provided by the server.

The user can pull the card from his wallet and then tap the phone to prove that the user has possession of the card. By answering a security question, the user can be given an opportunity to reset the user's password.

The card information can include the card user's name, card number, the billing address, and the card security code (CSC, CVV, CV2, CVC, or CCV). The card information can include any other information that can be used to verify possession of the card by the card user. The card information can include all the information that is available from the card. The card information can include one or more specific pieces of information from the card. In this manner, physical possession of the card by the purchaser, e.g., the user, can be verified.

A picture of the card can be captured by the user device. The picture can be compared to an authentic card. For example, the picture of the card being used can be compared to a picture of the same card as issued, such as from a database of such cards.

The hardware processor(s) can be operable to access the one or more memories to compare card information provided in the second communication to card information stored in the one or more memories. Thus, card information provided according to the card verification process, e.g., by the user's mobile device, can be compared to card information of the user's card account, to verify that the information provided by the user's mobile device is correct. If the information provided by the user's mobile device is correct, then the person attempting the purchase transaction can be assumed to be the legitimate card holder or user, the card can be assumed to be in the user's possession, and the purchase transaction can be assumed to be legitimate.

According to an embodiment, a method can comprise storing, in one or more memories, account information regarding an account of a card user; accessing, via one or more hardware processors, the one or more memories to determine that the account is subject to an account take over restrictions; sending, via the one or more hardware processors, a first communication to a mobile device of the card user requesting verification of a card via the mobile device; receiving, via the one or more hardware processors, a second communication from the mobile device indicating that a presence of the card has been detected by the mobile device and providing card information; determining, via the one or more hardware processors, at least in part from the card information and from the account information, if the card is an authorized card of the account; and accessing, via the one or more hardware processors, the one or more memories to remove the account take over restrictions if the card is the authorized card of the account.

According to an embodiment, a computer program product can comprise a non-transitory computer readable medium. The non-transitory computer readable medium can have computer readable and executable code for instructing one or more processors to perform any method disclosed herein.

FIG. 1 is a block diagram of a system for NFC card verification, according to an embodiment. A card 100 can communicate information to a mobile device 120. The mobile device 120 can use near field communication (NFC), radio frequency identification (RFID), bar code reading, quick response (QR) code reading, imaging, photography, character recognition, a card reading (such as via a portable credit card reader or dongle), or any other means of communicating information from the card 100 to the mobile device.

The mobile device 120 can comprise carried by the card user. The mobile device 120 can be a cellular telephone, a smart telephone, a hand held computer, a laptop computer, a notebook computer, or a tablet computer, for example. The mobile device 120 can include a processor 121, and a memory 122. The mobile device 120 can include circuitry for near field communication (NFC) 123.

The mobile device 120 can be used for routine telephone calls, text messaging, web browsing, and for verifying that a card user has possession of the card 100, as discussed herein.

An app 124 can be stored in the memory 122 and executed by the processor 121. The app 124 can be used for NFC card verification or the like.

The server 130 can comprise a server of a card processor. The server 130 can comprise a server of a payment provider, such as Paypal, Inc. The server 130 can be a single server or can be a plurality of servers. The server 130 can include one or more processors 131 and one or more memories 132. The memory 132 can be a memory of the server 130 or a memory that is associated with the server 130. The memory 132 can be a distributed memory. The memory 162 can store a card user account 163 and a merchant account 164. The card user account 163 can store information regarding the card user, the card 100, and purchase transactions. The merchant account 164 can contain information reading a merchant. The memory 132 can contain any number of user accounts and merchant accounts.

The server 130 can be used for processing payment transactions, such as payment provider transactions and/or credit card transactions. The server 130 can be used for verifying the possession of the card 100 by a card user, as disclosed herein. The server 130 can be dedicated to such tasks or can be used for any desired tasks.

The mobile device 120 and the server 130 can communicate with one another via a network, such as the Internet 140. The mobile device 120 and the server 130 can communicate with one another via one or more networks, such as local area networks (LANs), wide area networks (WANs), cellular telephone networks, and the like. The mobile device 120 and the server 130 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As mentioned above, the mobile device 120 can use near field communication (NFC), radio frequency identification (RFID), bar code reading, quick response (QR) code imaging, photo imaging, character recognition, a card reader, or any other means of communicating information from the card 100 to the mobile device. For example, the mobile device 120 can include or have attached thereto a bar code scanner or QR scanner that scans the card 100 for the information.

As a further example, the mobile device can include a camera that can be used to image the card 100. Optical character recognition (OCR) can be used to obtain the information from the image. Thus, information available on the front and/or back of the card 100 can be obtained and provided to the server 130.

Figure 2:
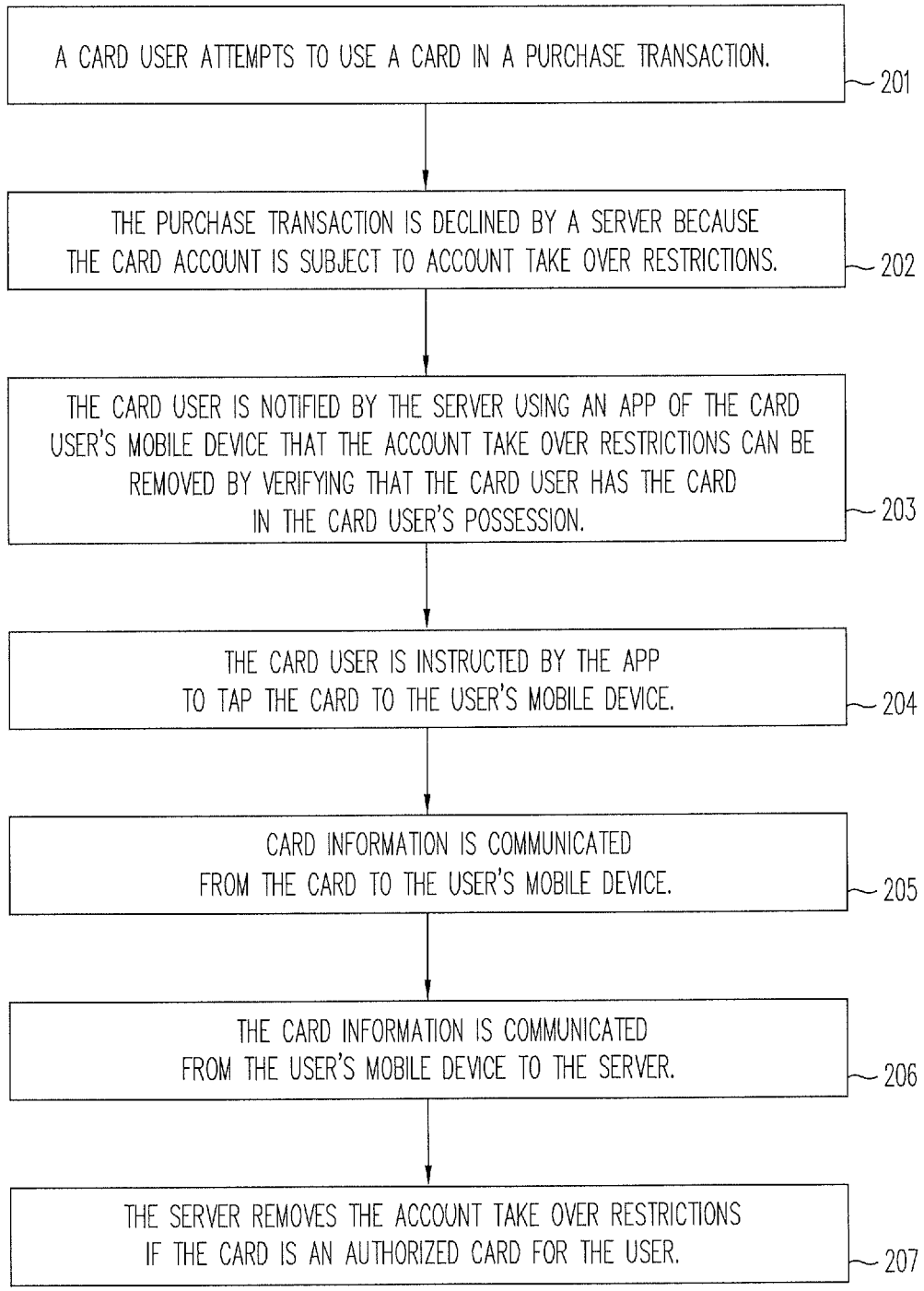
FIG. 2 is a flow chart showing a method for NFC card verification, according to an embodiment.
Figure 3:
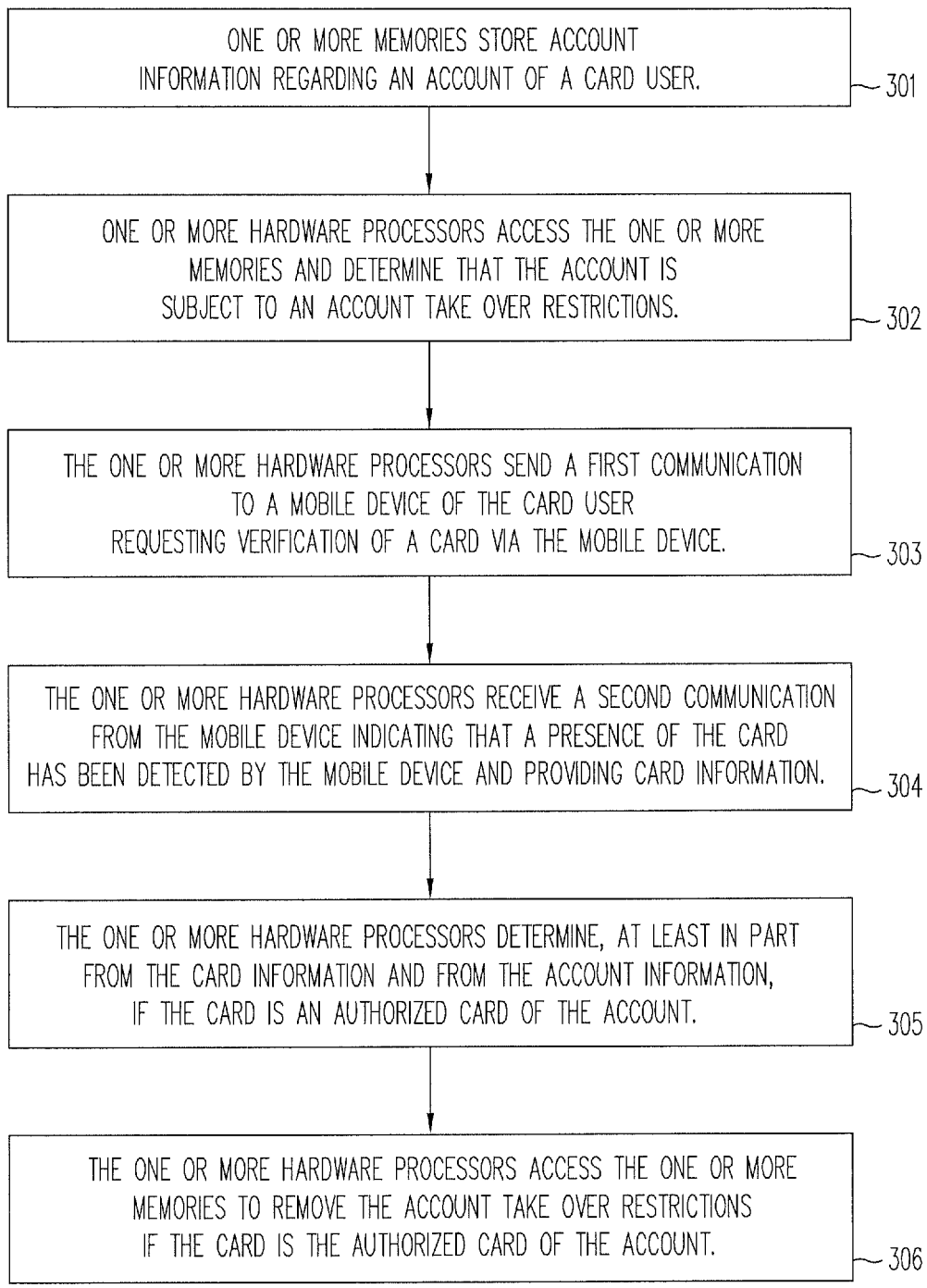
FIG. 3 is a flow chart showing further detail of the method for NFC card verification, according to an embodiment.

FIGS. 2 and 3 are flow charts that describe examples of operation of the system for NFC card verification according to embodiments thereof. Note that one or more of the steps described herein may be combined, omitted, or performed in a different order, as desired or appropriate.

FIG. 2 is a flow chart showing a method for NFC card verification, according to an embodiment. A card user can attempt to use the card 100 in a purchase transaction (such as to purchase a product), as shown in step 201. Such an attempt to use the card 100 can be over the telephone or via the Internet (such as for online sales), for example. In such situations, where the card user is not physically present at the location of the merchant, the merchant cannot verify that the user has physical possession of the card 100.

Such an attempt can be at a brick and mortar store. Generally, when a purchase transaction is made in person, e.g., at a brick and mortar store, physical possession of the card 100 can be readily verified, thus at least somewhat mitigating concerns regarding account takeover. However, even at a brick and mortar store, the merchant may be unable to verify that the card 100 is a legitimate card of the user. The card could be stolen. The card could be a counterfeit card.

The purchase transaction can be declined by a server because the card account is subject to account take over restrictions, as shown in step 202. The take over restrictions can prevent the card 100 from being used in any further purchase transactions. The take over restrictions can inhibit the authorization of a purchase transaction until the account take over restrictions are removed.

The account take over restrictions can result from a suspected account take over. A suspected account take over can occur when a card processor receives a false positive from a risk model. Various risk models are commonly used by card processor in an attempt to thwart fraudulent credit card use. Any suitable risk model can be used.

A suspected account take over can occur when a card processor detects suspicious activity associated with the card 100. For example, use of the card 100 outside of the geographic area within which the card 100 is typically used, such as out of state, can be considered suspicious activity. As a further example, use of the card 100 to purchase a product that the card user doesn't typically purchase can also be considered suspicious activity. As yet a further example, use of the card 100 to purchase a product having a higher purchase price than is typical for the card user can also be considered suspicious activity. As those skilled in the art will appreciate, many such criteria can be used to define suspicious activity.

The card user can be notified by the server 130, such as by using the app 124 of the card user's mobile device 120, that the account take over restrictions can be removed by verifying that the card user has the card 100 in the card user's possession, as shown in step 203. The communication can be via text messaging, email, voice (or voice mail), displaying a web site, or any other means.

For example, when the card 100 is declined, the user can initiate the app 124 that results in communication between the user's mobile device 120 and the server 130. The server 130 can notify the card user regarding the account take over restrictions via the user's mobile device 120 using the app 124. The app can be notified of the account take over restrictions and can then notify the card user.

The app can be initiated automatically in response to the card 100 being declined. For example, when the card 100 is declined, the server 130 can send a communication to the user's mobile device 120 that results in the app 124 being initiated. The communication to the user's mobile device 120 can come from any other source. For example, a device of the merchant can provide the communication to the user's mobile device 129.

The card user can be instructed by the app to tap the card 100 to the user's mobile device 120, as shown in step 204. Tapping of the card 100 to the user's mobile device 120 can start near field communication (NFC) between the card 100 and the user's mobile device 120. Alternatively, such NFC can be started simply by moving the card 100 proximate the user's mobile device 120. Communication between the card 100 and the user's mobile device 120 can be performed in any desired manner and can be started in any desired manner.

Card information can be communicated from the card 100 to the user's mobile device 120, as shown in step 205. The card information can be communicated from the user's mobile device 120 to the server 130, as shown in step 206. The card information can be communicated from the user's mobile device 120 to the server 130 via the Internet 140, for example. The card information can be communicated from the user's mobile device 120 to any other device via any desired method.

The server 130 can remove the account take over restrictions if the card 100 is an authorized card for the user, as shown in step 207. The server 130 can use the information provided by the user's mobile device 120 to determine that the card 100 is a legitimate card of the user. For example, the server 130 can compare the card information provided by the user's mobile device 120 (the information communicated from the card 100 to the mobile device 120) to corresponding information in a database, such as a database of the server 134. Sufficient correspondence between the card information provided by the mobile device 120 and the card information of the database can indicate that the card 100 is a legitimate card of the user.

FIG. 3 is a flow chart showing further detail of the method for NFC card verification, according to an embodiment. One or more memories can store account information regarding an account of a card user, as shown in step 301. This account information can be part of the database of the server 130, for example.

One or more hardware processors can access the one or more memories and determine that the account is subject to an account take over restrictions, as shown in step 302. This can occur, for example, as the result of an attempted telephone or online purchase transaction by the card user. It can also occur due to suspicious activity by a fraudster.

The one or more hardware processors can send a first communication to a mobile device of the card user. The first communication can request verification of a card 100 via the mobile device, as shown in step 303. The first communication can request that the user perform verification steps, such as initiate communication between the card 100 and the user's mobile device 120. Instruction for initiating such communication can be provided in the first communication or can be initiated by the first communication.

The one or more hardware processors receive a second communication from the mobile device indicating that a presence of the card 100 has been detected by the mobile device and providing card information, as shown in step 304. The card information can be used by the server 130, for example, to verify the card 100 as discussed herein. Thus, the one or more hardware processors determine, at least in part from the card information and from the account information, if the card 100 is an authorized card of the account 305.

The one or more hardware processors can access the one or more memories to remove the account take over restrictions if the card 100 is the authorized card of the account, as shown in step 306. Once the account take over restriction have been removed, the purchase transaction can be completed. The card user, the merchant, or both can be informed that the account take over restricts have be removed so that the purchase transaction can be completed.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include card user account and identifier information and authentication, merchant information, and transaction details. The card user account may be accessed to determine if any restrictions or limitations may prevent the transaction from being approved. If approved, the payment provider may send a notification to the merchant and/or the card user.

Figure 4:
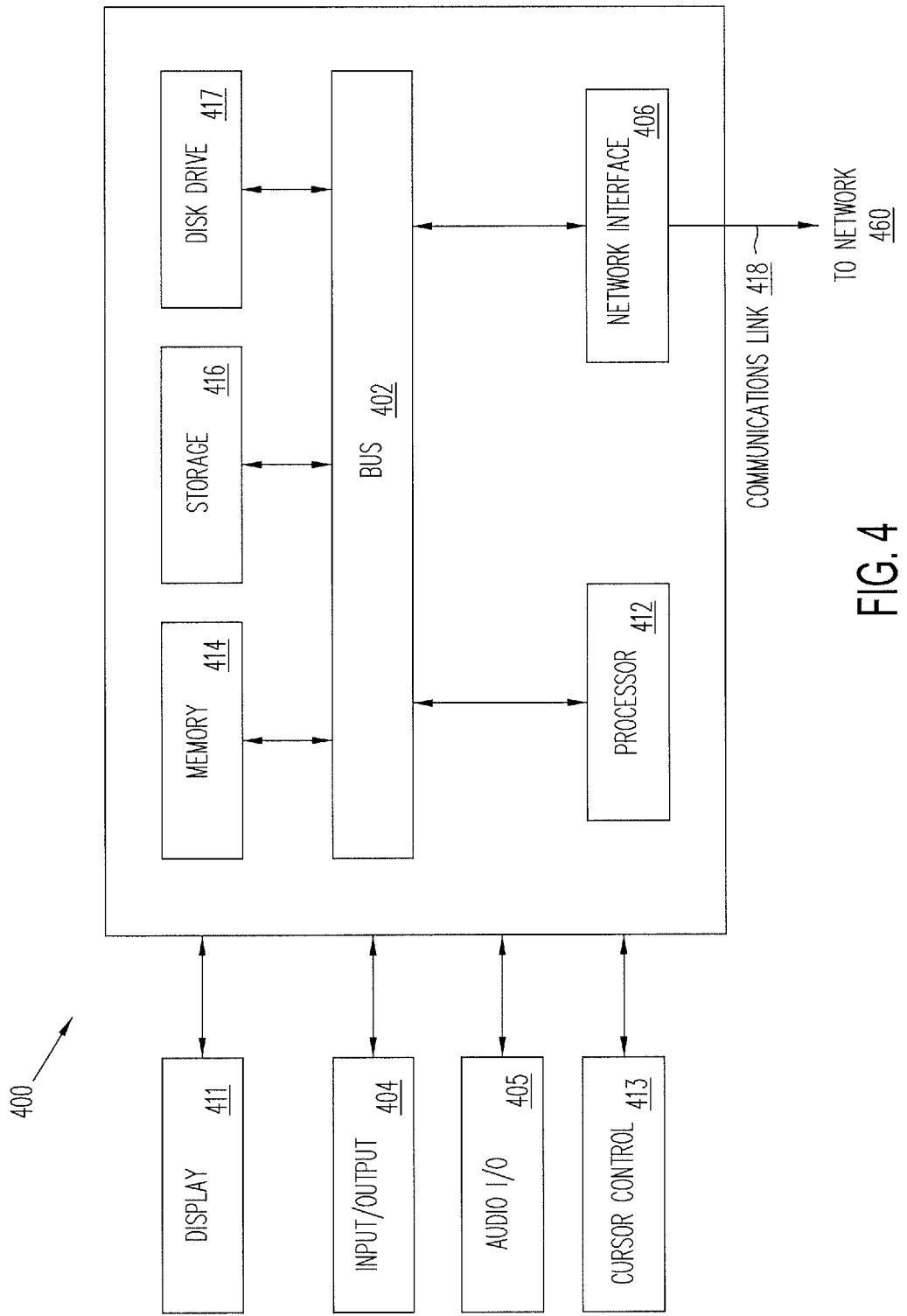
FIG. 4 is a block diagram of an example of a computer that is suitable for use in the system for NFC card verification, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by card users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a card user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a card user to use voice for inputting information by converting audio signals. Audio I/O component 405 may allow the card user to hear audio. A transceiver or network interface 406 transmits and receives signals between computer system 400 and other devices, such as a card user device, a merchant server, or a payment provider server via network 460, In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the temi "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a card user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the temi "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, private label card or other device. The card can be a token, such as a hardware token or a software token. The card or token can be stored in and/or displayed upon a card user device, such as a cellular telephone. The card can be NFC enable or can have any other means for communicating with the user's mobile device.

Rather than the user's mobile device, the card can communicate with another person's mobile device, any other mobile device, or any other device. For example, the card can communicate with a desktop computer instead of a mobile device to facilitate verification of the card.

As used herein, the term "card processor" can refer to a company that process card transaction. For example, the card processor can authorize card transactions. The card processor can use various tools to determine if a card transaction should be authorized. For example, the card processor can use the Address Verification System to verify the billing address of the card holder. As a further example, the card processor can use various risk models to determine if a purchase transaction is likely to be illegitimate. The card processor can be a bank, a card company, a payment provider, or any other entity.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
accessing an account of a card user;

determining that the account of the card user is subject to account take over restrictions that prevent an authorized card associated with the account from being used in a purchase transaction;

in response to the determining, transmitting a first communication to a mobile device of the card user, wherein the first communication automatically initiates an application on the mobile device without the card user initiating the application;

initiating near field communication (NFC) circuitry of the mobile device using the first communication, wherein the first communication comprises an instruction for reading an NFC-enabled card using NFC communications by the NFC circuitry;

in response to transmitting the first communication to the mobile device, receiving information indicating a presence of the NFC-enabled card has been detected using the NFC communications transmitted by the NFC circuitry;

receiving a second communication from the application, wherein the second communication comprises card information received by the application using the NFC circuitry;

determining, at least in part from the card information and from account information for the account, if the NFC-enabled card detected by the mobile device is the authorized card associated with the account; and removing the account take over restrictions if the NFC-enabled card detected by the mobile device is the authorized card associated with the account.

2. The system of claim 1, wherein the operations further comprise:
running a risk model for the account.

3. The system of claim 2, wherein the account take over restrictions is due, at least in part, to the risk model providing a positive result for account take over.

4. The system of claim 1, wherein the card information is communicated from the NFC-enabled card to the mobile device using the NFC circuitry by tapping the mobile device with the NFC-enabled card.

5. The system of claim 1, wherein the instruction in the application requests that the card user moves the NFC-enabled card proximate to the mobile device to facilitate identification of the NFC-enabled card by the mobile device.

6. The system of claim 1, wherein the determining if the NFC-enabled card detected by the mobile device is the authorized card associated with the account comprises comparing the card information provided in the second communication to stored card information for the authorized card.

7. A method comprising:
accessing account information regarding an account of a card user;

determining, via one or more hardware processors, that the account is subject to account take over restrictions that prevent an authorized card associated with the account from being used in a purchase transaction;

in response to the determining, transmitting a first communication to a mobile device of the card user, wherein the first communication automatically initiates an application on the mobile device;

initiating near field communication (NFC) circuitry of the mobile device using the first communication, wherein the first communication comprises an instruction for reading an NFC-enabled card using NFC communications by the NFC circuitry;

in response to transmitting the first communication to the mobile device, receiving, via the one or more hardware processors, information indicating a presence of the NFC-enabled card has been detected using the NFC communications transmitted by the NFC circuitry;

receiving a second communication from the application, wherein the second communication comprises card information received by the application using the NFC circuitry;

determining, via the one or more hardware processors, at least in part from the card information and from the account information, if the NFC-enabled card detected by the mobile device is the authorized card associated with the account; and removing, via the one or more hardware processors, the account take over restrictions if the NFC-enabled card detected by the mobile device is the authorized card associated with the account.

8. The method of claim 7, further comprising:
running, via the one or more hardware processors, a risk model for the account.

9. The method of claim 7, further comprising:
running, via the one or more hardware processors, a risk model for the account; and
wherein the account take over restrictions are due, at least in part, to the risk model providing a positive result for account take over.

10. The method of claim 7, wherein the card information is communicated from the NFC-enabled card to the mobile device using the NFC circuitry by tapping the mobile device with the NFC-enabled card.

11. The method of claim 7, wherein the instruction in the application requests that the card user moves the NFC-enabled card proximate to the mobile device to facilitate identification of the NFC-enabled card by the mobile device.

12. The method of claim 7, wherein the determining if the NFC-enabled card detected by the mobile device is the authorized card associated with the account comprises comparing the card information provided in the second communication to stored card information for the authorized card.

13. A non-transitory machine-readable medium having stored thereon machine-readable instructions executable to cause a machine to perform operations comprising:
accessing account information regarding an account of a card user;

determining that the account is subject to an account take over restrictions that prevent an authorized card associated with the account from being used in a purchase transaction;

in response to the determining, transmitting a first communication to a mobile device of the card user, wherein the first communication automatically initiates an application on the mobile device without the card user initiating the application;

initiating near field communication (NFC) circuitry of the mobile device using the first communication, wherein the first communication comprises an instruction for reading an NFC-enabled card using NFC communications by the NFC circuitry;

in response to transmitting the first communication to the mobile device, receiving information indicating a presence of the NFC-enabled card has been detected using the NFC communications transmitted by the NFC circuitry;

receiving a second communication from the application, wherein the second communication comprises card information received by the application using the NFC circuitry;

determining, at least in part from the card information and from the account information, if the NFC-enabled card detected by the mobile device is the authorized card associated with the account; and removing the account take over restrictions if the NFC-enabled card detected by the mobile device is the authorized card associated with the account.

14. The non-transitory machine-readable medium of claim 13, the operations further comprising:

running a risk model for the account; and wherein the account take over restrictions is due, at least in part, to the risk model providing a positive result for account take over.

15. The non-transitory machine-readable medium of claim 13, wherein the card information is communicated from the NFC-enabled card to the mobile device using the NFC circuitry by tapping the mobile device with the NFC-enabled card.

16. The non-transitory machine-readable medium of claim 13, wherein the instruction in the application requests that the card user moves the NFC-enabled card proximate to the mobile device to facilitate identification of the NFC-enabled card by the mobile device.

17. The non-transitory machine-readable medium of claim 13, wherein the determining if the NFC-enabled card detected by the mobile device is the authorized card associated with the account comprises comparing the card information provided in the second communication to stored card information for the authorized card.

18. The system of claim 1, wherein the first communication is transmitted to automatically initiate the application in response to a declined transaction of the authorized card based on the account take over restrictions.

19. The method of claim 7, wherein the first communication is transmitted to automatically initiate the application in response to a declined transaction of the authorized card based on the account take over restrictions.

20. The non-transitory machine-readable medium of claim 13, wherein the first communication is transmitted to automatically initiate the application in response to a declined transaction of the authorized card based on the account take over restrictions.

* * * * *

UNITED STATES PATENT AND TRADEMARK OFFICE
CERTIFICATE OF CORRECTION

| | | |
|---|---|---|
| PATENT NO. | : 10,304,050 B2 | Page 1 of 1 |
| APPLICATION NO. | : 13/766212 | |
| DATED | : May 28, 2019 | |
| INVENTOR(S) | : Suhil Srinivas Vakklaganti | |

It is certified that error appears in the above-identified patent and that said Letters Patent is hereby corrected as shown below:

In the Specification

In Column 8, Line 49, change "via network 460," to --via network 460.--

In Column 9, Line 64, change "the temi "store" can include" to --the term "store" can include--

In Column 10, Line 11, change "the temi "merchant" can include" to --the term "merchant" can include--

Signed and Sealed this
Seventeenth Day of September, 2019

Andrei Iancu
*Director of the United States Patent and Trademark Office*